(12) United States Patent  
Chiticariu et al.

(10) Patent No.: US 8,775,419 B2
(45) Date of Patent: *Jul. 8, 2014

(54) REFINING A DICTIONARY FOR INFORMATION EXTRACTION

(75) Inventors: Laura Chiticariu, San Jose, CA (US); Vitaly Feldman, Palo Alto, CA (US); Frederick R. Reiss, Sunnyvale, CA (US); Huaiyu Zhu, Union City, CA (US); Sudeepa Roy, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/598,946

(22) Filed: Aug. 30, 2012

(65) Prior Publication Data

US 2013/0318076 A1 Nov. 28, 2013

Related U.S. Application Data

(63) Continuation of application No. 13/480,974, filed on May 25, 2012, now abandoned.

(51) Int. Cl.
*G06F 17/30* (2006.01)
(52) U.S. Cl.
USPC .......................................... 707/723; 707/748
(58) Field of Classification Search
USPC ................. 707/723, 743, 748; 704/275, 10
See application file for complete search history.

(56) References Cited

U.S. PATENT DOCUMENTS

| | | | |
|---|---|---|---|
| 5,995,922 A | 11/1999 | Penteroudakis et al. | |
| 6,804,665 B2 * | 10/2004 | Kreulen et al. | 1/1 |
| 7,249,013 B2 * | 7/2007 | Al-Onaizan et al. | 704/9 |
| 7,272,560 B2 | 9/2007 | Abrego et al. | |
| 7,580,830 B2 * | 8/2009 | Al-Onaizan et al. | 704/2 |
| 7,660,806 B2 | 2/2010 | Brill et al. | |
| 8,417,709 B2 * | 4/2013 | Chiticariu et al. | 707/743 |
| 2002/0156817 A1 | 10/2002 | Lemus | |
| 2003/0191626 A1 * | 10/2003 | Al-Onaizan et al. | 704/8 |
| 2008/0091434 A1 * | 4/2008 | Rodriguez et al. | 704/275 |
| 2008/0114583 A1 * | 5/2008 | Al-Onaizan et al. | 704/2 |
| 2008/0319738 A1 * | 12/2008 | Liu et al. | 704/10 |
| 2009/0240501 A1 | 9/2009 | Chen et al. | |
| 2010/0131507 A1 | 5/2010 | Pradhan et al. | |
| 2013/0159318 A1 * | 6/2013 | Xu et al. | 707/748 |

FOREIGN PATENT DOCUMENTS

JP 2006099269 4/2006

OTHER PUBLICATIONS

Refining Information Extraction Rules using Data Provenance, Bin Liu et al., 2010 IEEE.*
Provenance-based Dictionary Refinement in Information Extraction, Sudeepa Roy et al., 2013 ACM.*
Roy et al. "Optimization Problems for Dictionary Refinement in Information Extraction" Proceedings of the VLDB Endowment, vol. 5, No. 1, (2011), 12 pages.

* cited by examiner

*Primary Examiner* — Jean M Corrielus
(74) *Attorney, Agent, or Firm* — Jeffrey T. Holman

(57) ABSTRACT

A method for refining a dictionary for information extraction, the operations including: inputting a set of extracted results from execution of an extractor comprising the dictionary on a collection of text, wherein the extracted results are labeled as correct results or incorrect results; processing the extracted results using an algorithm configured to set a score of the extractor above a score threshold, wherein the score threshold balances a precision and a recall of the extractor; and outputting a set of candidate dictionary entries corresponding to a full set of dictionary entries, wherein the candidate dictionary entries are candidates to be removed from the dictionary based on the extracted results.

7 Claims, 5 Drawing Sheets

REFINING A DICTIONARY FOR INFORMATION EXTRACTION

CROSS-REFERENCE TO RELATED APPLICATIONS

This application is a continuation of U.S. application Ser. No. 13/480,974, filed on May 25, 2012, which is incorporated by reference herein in its entirety.

BACKGROUND

Extracting structured information from unstructured text is an essential component of many important applications including business intelligence, social media analytics, semantic search, and regulatory compliance. The success of these applications is tightly connected with the quality of the extracted results. Incorrect or missing results may often render the application useless.

Building high-quality information extraction rules to extract structured information from unstructured text is a difficult and time-consuming process. Exhaustive dictionaries of words and phrases are integral to any information extraction system. One of the most important parts of this process can include refining the dictionaries by selectively removing dictionary entries that lead to false positives. Sophisticated extractors that use greater numbers of fine-grained dictionaries to improve accuracy also increase the difficulty of refining the dictionaries for efficient and accurate extraction due to the size and number of dictionaries.

SUMMARY

Embodiments of a method are described. In one embodiment, the method is a method for refining a dictionary for information extraction. The method includes: inputting a set of extracted results from execution of an extractor comprising the dictionary on a collection of text, wherein the extracted results are labeled as correct results or incorrect results; processing the extracted results using an algorithm configured to set a score of the extractor above a score threshold, wherein the score threshold balances a precision and a recall of the extractor; and outputting a set of candidate dictionary entries corresponding to a full set of dictionary entries, wherein the candidate dictionary entries are candidates to be removed from the dictionary based on the extracted results. Other embodiments of the method are also described.

BRIEF DESCRIPTION OF THE DRAWINGS

Throughout the description, similar reference numbers may be used to identify similar elements.

DETAILED DESCRIPTION

Figure 1:
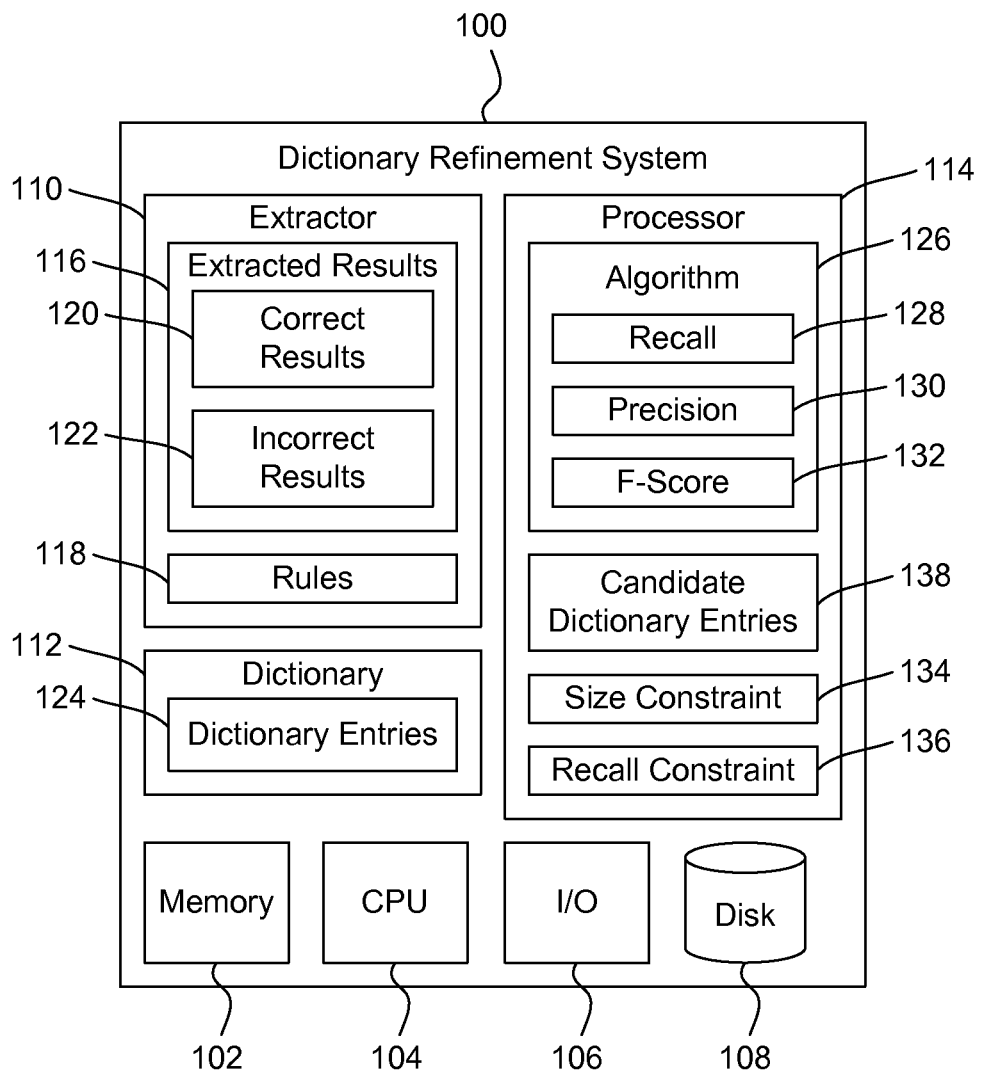
FIG. 1 depicts a schematic diagram of one embodiment of a dictionary refinement system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments present a system and method for refining at least one dictionary for information extraction. More specifically, the system uses statistical modeling and refinement optimization to balance the precision and recall of an extractor for efficient, accurate information extraction. The system may use extracted results that have been labeled as correct or incorrect to determine candidate entries 138 to be removed from the dictionary to provide the highest precision for avoiding false positives while minimizing any decrease in recall. These candidate entries 138 may also be analyzed by a user to determine which entries should be removed from the dictionary.

In general, developing and maintaining high-quality extractors is a laborious and time consuming process. When creating an extractor, developers may start by writing an initial extractor that includes an initial set of basic features and rules that combine the features to extract the desired entities. The extractor may be executed on a document collection, the results may be examined to determine the cause of incorrect results, and the features and rules may then be refined to remove the incorrect results. This process may be repeated as many times as necessary to obtain satisfactory performance of the extractor. Generally, removing the sources of false positives from the extractor helps produce a higher precision in the extracted results. Specifically, refining dictionaries used in an extractor by removing the sources (words or phrases) of false positives can improve the quality of the extractor. The system and method described herein allow the refinement of dictionaries to improve the precision (minimization of false positives) of the extractor while maintaining a sufficient level of recall (avoidance of discarding correct answers) for the extractor.

Refining the dictionary may be divided into two sub-problems: statistical modeling and refinement optimization. The primary goal of the statistical modeling problem is to estimate the precision of each individual dictionary entry in an extractor, given a set of extracted entities that have been labeled as "correct" or "incorrect". Labeling the outputs of extractors may be an expensive task requiring large amounts of human effort. Dictionaries frequently contain thousands of entries, so very little information about individual entries may be available even with a large collection of labeled data. Consequently, the extractor may need to be capable of coping with very sparse labeled data in order to be usable in practice.

The refinement optimization problem involves using the outputs of parameter estimation to choose the best set of entries to remove from the dictionary in order to improve the quality of the extractor. Balancing the requirements of precision and recall allow the maximization of an F-score (the harmonic mean of precision and recall) for the extractor. In some embodiments, the F-score maximization may be subject to a limit on the number of entries removed from the dictionary, or the maximum allowable decrease in recall.

Figure 4:
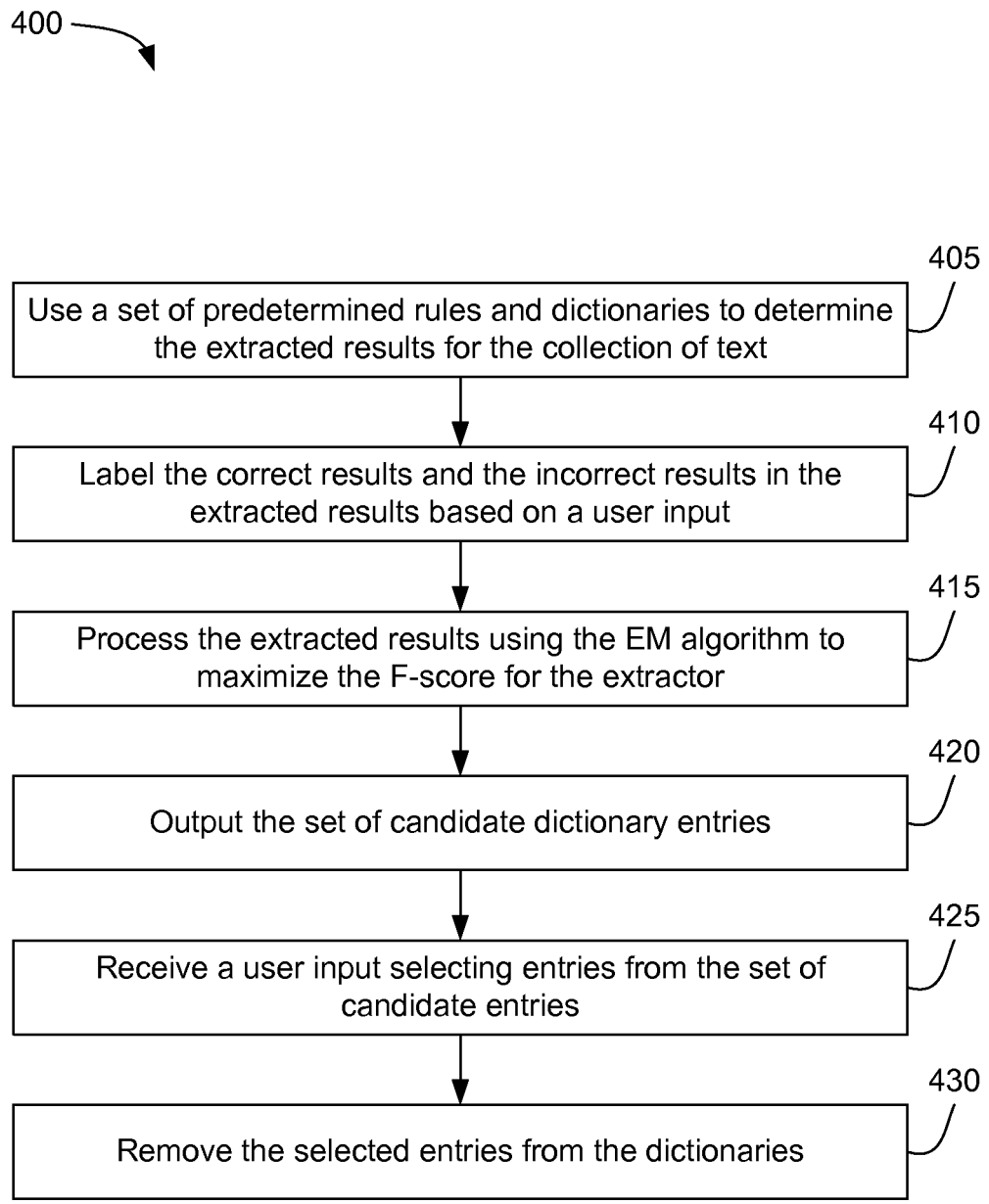
FIG. 4 depicts a flowchart diagram of one embodiment of a method for refining a dictionary for information extraction.

FIG. 1 depicts a schematic diagram of one embodiment of a dictionary refinement system 100. The depicted dictionary refinement system 100 includes various components, described in more detail below, that are capable of performing the functions and operations described herein. In one embodiment, at least some of the components of the dictionary refinement system 100 are implemented in a computer system. For example, the functionality of one or more components of the dictionary refinement system 100 may be implemented by computer program instructions stored on a computer memory device 102 and executed by a processing device 104 such as a CPU. The dictionary refinement system 100 may include other components, such as input/output devices 106, a disk storage drive 108, an extractor 110, a dictionary 112, and a processor 114. Some or all of the components of the dictionary refinement system 100 may be stored on a single computing device or on a network of computing devices, including a wireless communication network. The dictionary refinement system 100 may include more or fewer components or subsystems than those depicted herein. In some embodiments, the dictionary refinement system 100 may be used to implement the methods described herein as depicted in FIG. 4.

In one embodiment, the processor 114 is wholly contained within the processing device 104. In another embodiment, the processor 114 includes one or more separate devices that may be spread among a network of computers, such that the processing capabilities are shared by multiple computing devices and/or executed simultaneously. In various embodiments, the extractor is implemented in the processing device 104 or the processor 114. In one embodiment, the dictionary 112 is contained on the storage disk 108 on the same computing device as the processing device 104, though the dictionary 112 may be contained on any number of storage disks 108. In one embodiment, the dictionary refinement system 100 includes more than one dictionary 112. Each dictionary 112 may be a specialized dictionary for any given subject or grouping of information.

In one embodiment, the extractor 110 is applied to a collection of text, dictionary entries 124 in the dictionary 112 are matched to the collection of text and the extractor 110 outputs extracted results 116. The extractor may include multiple dictionaries 112 and may be applied to the collection of text based on a set of predefined rules 118. At least some of the extracted results 116 may be labeled by a user to identify correct results 120 (true positives) and incorrect results 122 (false positives). In one embodiment, the precision 130 of the extractor 110 is the fraction of true positives among the total number of extracted results 116. The precision of each dictionary entry 124 is the probability that an extracted entity will be correct, given that the entity is based, in whole or in part, on a match of the dictionary entry 124. An extractor 110 with high precision 130 outputs few incorrect results 122. An expected mention that is not identified by the extractor 110 is referred to herein as a missing result or a false negative. The term "recall" 128 is broadly interpreted herein to include the fraction of true positives among the total number of expected occurrences. An extractor 110 with high recall 128 misses very few expected results. In one embodiment, the recall 128 and precision 130 are balanced to maximize a score of the extractor, for example, by setting the score above a score threshold that may be predetermined based on a desired balance of the precision 130 and recall 128. The score may be an F-score, an F-measure, or some other measure of scoring the dictionary. The term "F-score" 132, or "F-measure", is broadly interpreted herein to include combining precision 130 and recall 128 into a single measure that is computed as the harmonic mean of precision 130 and recall 128 depicted as $$\frac{2PR}{(P+R)}$$

where P is the precision 130 and R is the recall 128.

In various embodiments, the refinement optimization problem includes executing a refinement algorithm 126 under two constraints. First, because the refinement of an extractor 110 is often done with human supervision, the problem may include a size constraint 134 to limit the size of dictionary entries 124 to be examined at a time. For an extractor E, the size constraint 134 may include a set S of size at most k to maximize the F-score 132 of the resulting extractor E'. Alternatively, the extractor 110 may be refined such that the recall 128 does not fall below a certain limit using a recall constraint 136. The recall constraint 136 includes a set w such that the F-score 132 of E' is maximized, while at the same time the recall 128 of E' does not decrease more than a fixed budget. In other embodiments, the refinement optimization problem may be approached without constraints on size or recall 128. The algorithm 126 produces a set of candidate dictionary entries 138 that may be removed from the dictionary 112 to improve performance of the extractor 110.

Maximizing the quality of the extractor 110 on the entirety of the labeled dataset for the extracted results 116 may not be useful in practice. Instead, by using statistical modeling and refinement optimization, the system may maximize the quality of the extractor 110 in general and avoid overfitting to the labeled dataset. The system may use a model for refining the dictionary 112 by estimating the parameters of the model including the precision 130 of each individual dictionary entry, given the set of extracted results 116 that have been labeled as correct or incorrect.

Figure 2:
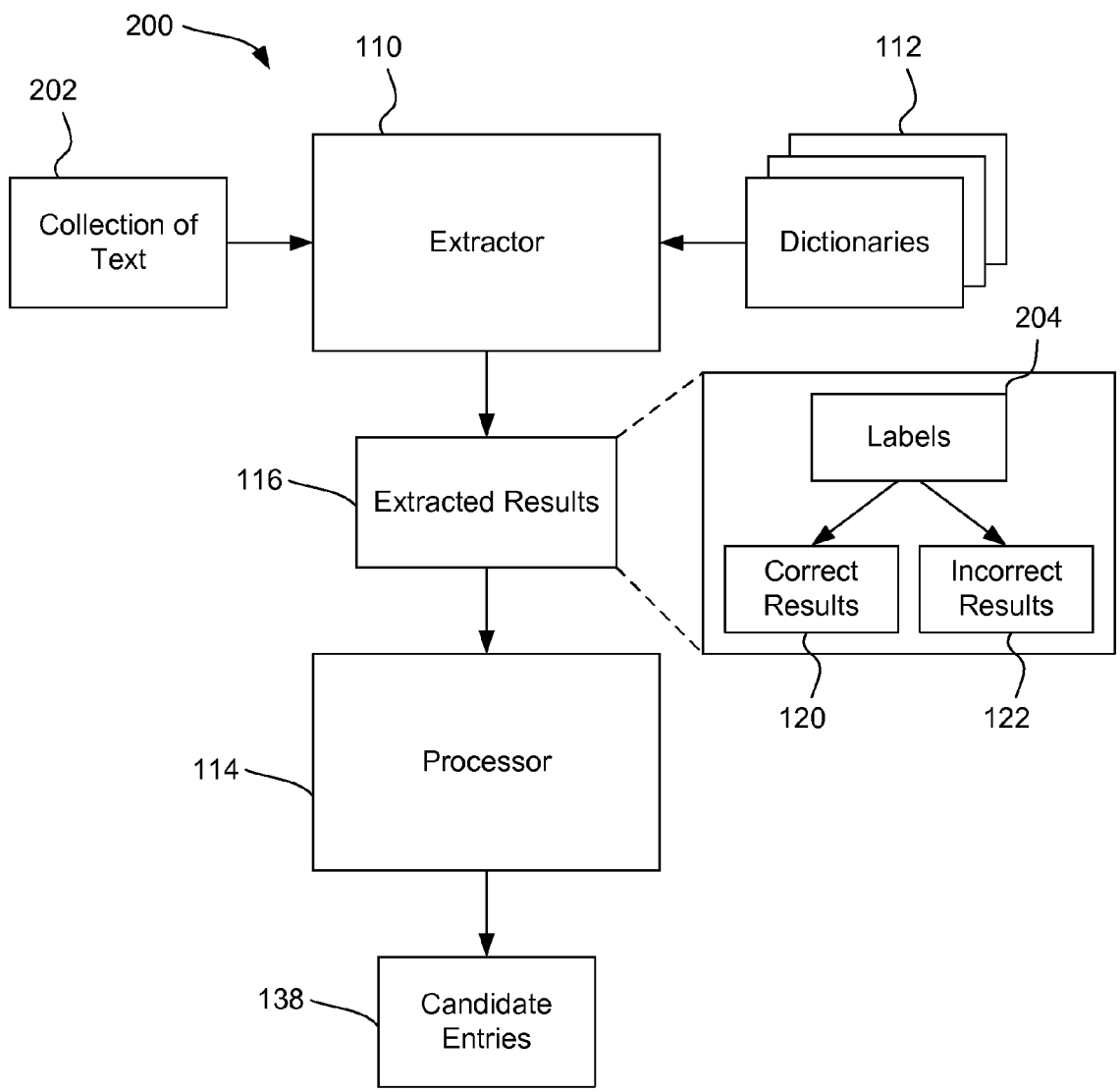
FIG. 2 depicts a flowchart diagram of one embodiment of a method for determining candidate dictionary entries.

FIG. 2 depicts a flowchart diagram of one embodiment of a method 200 for determining candidate dictionary entries 138. While the method 200 is described in conjunction with the dictionary refinement system 100 of FIG. 1, embodiments of the method 200 may be implemented with other types of dictionary refinement systems 100.

In one embodiment, the extractor 110 receives a collection of text 202 to be matched to a set of one or more dictionaries 112 according to a set of rules associated with the extractor 110. Each dictionary 112 may include a set of dictionary entries 124 corresponding to a given subject or grouping of words and phrases. Some of the entries 124 in the dictionaries 112 may overlap with other dictionaries 112, depending on the subjects or groupings for the dictionaries 112.

The extractor 110 is applied to the collection of text 202 and outputs the extracted results 116. For each result 116, the system 100 examines the rules and dictionaries 112 of the extractor 110 and determines which dictionaries 112 are involved in producing the extracted result 116, and also determines the provenance of the extracted result 116. Some or all of the extracted results 116 are then given labels 204 as correct results 120 or incorrect results 122 based on a user input. The incorrect results 122 are false positives output by the extractor 110. For example, given a dictionary 112 containing "first name" entries, a second dictionary 112 containing "last name" entries, and a third dictionary 112 containing "full name" entries, the collection of text 202 may include a phrase "Mark Calendar" that is marked as a name based on matches in one or more of the dictionaries 112.

The extracted results 116 are input into the processor 114, and the processor 114 uses an algorithm 126 that maximizes the F-score 132 for the extractor 110. The algorithm 126 produces a set of candidate dictionary entries 138 for each dictionary 112 that are output by the processor 114. The set of candidate dictionary entries 138 are candidates that may be removed from the dictionary 112 that would maximize the F-score 132 for the extractor 110.

Because the labels 204 for a given false positive may be determined by multiple dictionary entries 124, the label 204 may not be used to estimate the precision 130 of a dictionary entry directly. Using the false positive example given above, it is not clear whether the false positive is because "Mark" is an incorrect first name, "Calendar" is an incorrect last name, or both. Furthermore, the same dictionary entry can contribute to different results, some correct and some incorrect. For example, "Mark" may contribute to an incorrect result "Mark Calendar", as well as a correct result for "Mark Smith". In this case, the processor 114 determines the candidate dictionary entries 138 by using the provenance of each false positive to model the complex dependencies between the dictionary entries 124 and the extracted results 116, along with an algorithm 126 for estimating precisions 130 based on an expectation-maximization (EM) algorithm.

In one embodiment, the algorithm 126 is configured to determine which dictionary entries 124 may be removed to result in the highest quality improvement of the extractor 110. In another example, two dictionary entries "Chelsea" and "Mark" are both ambiguous as a person name. If "Chelsea" is labeled as an incorrect result 60 times and as a correct result 40 times, and "Mark" is labeled as an incorrect result 9 times and as a correct result 1 time, the precision 130 of "Mark" (10%) is lower than that of "Chelsea" (40%). However, removing "Chelsea" results in removing more incorrect results 122, possibly leading to a higher overall quality improvement for the extractor 110.

Figure 3:
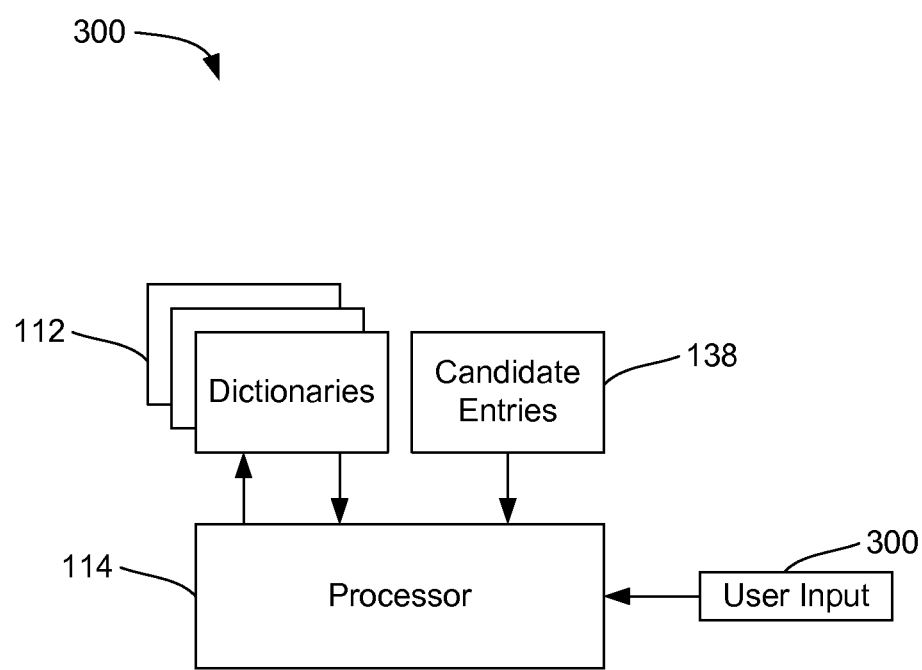
FIG. 3 depicts a flowchart diagram of one embodiment of a method for refining a dictionary.

FIG. 3 depicts a flowchart diagram of one embodiment of a method for refining a dictionary 112. While the method is described in conjunction with the dictionary refinement system 100 of FIG. 1, embodiments of the method may be implemented with other types of dictionary refinement systems 100.

In one embodiment, after the processor 114 outputs the candidate dictionary entries 138, the processor 114 then receives a user input 302 that selects one or more of the candidate dictionary entries 138 for removal from the dictionaries 112. The processor 114 may then read the dictionary entries 124 currently stored in the dictionaries 112, remove the selected dictionary entries, and modify the dictionaries 112 according to the new set of dictionary entries 124. This may allow a user to manually refine the candidate dictionary entries 138 by determining which entries from the set of candidate dictionary entries 138 are actually removed from the dictionaries 112.

FIG. 4 depicts a flowchart diagram of one embodiment of a method 400 for refining a dictionary 112 for information extraction. While the method 400 is described in conjunction with the dictionary refinement system 100 of FIG. 1, embodiments of the method 400 may be implemented with other types of dictionary refinement systems 100.

In one embodiment, the dictionary refinement system 100 inputs a set of extracted results 116 from matching the dictionary 112 to the collection of text 202. The extracted results 116 are labeled 410 as correct results 122 or incorrect results 122. In some embodiments, the extracted results 116 that are labeled include only a portion of the entities from the collection of text 202 matched to entries 124 in the dictionary 112. In one embodiment, the system uses 405 a set of predetermined rules 118 and a dictionary 112 to determine the extracted results 116 for the collection of text 202. In one embodiment, the correct results 122 and incorrect results 122 are labeled based on a user input 302.

The dictionary refinement system 100 processes 415 the extracted results 116 using an algorithm 126 configured to maximize an F-score 132 for the extractor 110, for example, by setting the F-score above a score threshold. The score threshold for the maximized F-score 132 balances the precision 130 and recall 128 of the extractor 110. The system may process the extracted results 116 by computing the set of candidate dictionary entries 138 that maximize the F-score 132 under a maximum size constraint 134 for the set of candidate dictionary entries 138. The system may process the extracted results 116 by computing the set of candidate dictionary entries 138 that maximize the F-score 132 within an allocated recall constraint 136. The recall constraint 136 determines a minimum coverage of the dictionary 112, which may help the system avoid false negatives. The system may process the extracted results 116 by estimating the precision 130 of each dictionary entry in the full set of dictionary entries 124 using the extracted results 116. The algorithm 126 used by the system may be the EM algorithm.

The dictionary refinement system 100 outputs 420 a set of candidate dictionary entries 138 corresponding to a full set of dictionary entries 124 of the dictionary 112. The candidate dictionary entries 138 are candidates to be removed from the dictionary 112 based on the extracted results 116. In one embodiment, the dictionary refinement system 100 receives 425 a user input 302 to select dictionary entries from the set of candidate dictionary entries 138. The dictionary refinement system 100 then removes 430 the selected dictionary entries from the dictionary 112.

In some embodiments, the system may obtain extracted results 116 using a plurality of specialized dictionaries. Each dictionary 112 may produce extracted results 116 labeled as correct results 122 or incorrect results 122, which may then be processed for each corresponding dictionary 112 to determine which dictionary entries 124 should be removed for greatest improvement of the performance of the extractor 110.

In one embodiment, for a single dictionary case, the dictionary A contains a set of n entries 124. A given partially labeled corpus may be a random sample of entries from A sampled independently according to their relative frequency denoted by $f_w$, i.e., any occurrence in the corpus is a match for entry w with probability $f_w$ and $$\sum_{w \in A} fx = 1.$$

In addition, each entry has a fixed precision $p_w \in [0,1]$. An occurrence of an entry w is Good if it is a correct match for the annotation used in a query, otherwise the occurrence is Bad. For example, a match for 'Ford', 'Chelsea' or 'Mark' is Good for the Person annotator if the match corresponds to a person name, and Bad otherwise. In practice, a human annotator labels a subset of the occurrences explicitly as Good or Bad. In one embodiment, it is assumed that each occurrence of w in the given corpus was chosen to be Good with probability $p_w$ and Bad with probability $1-p_w$ randomly and independently of the other occurrences and of whether the label 204 is given to the refinement algorithm 126. For an entry w let $t_w$ denote the number of occurrences of w in the given corpus, $g_w$ denote the number of times the entry was labeled Good and $b_w$ denote the number of times the entry was labeled Bad.

For the collections of text 202 in which the total number of occurrences is much larger than the number of labeled occurrences, the empirical frequencies $$\left( t_w \Big/ \sum_{w \in A} t_w \right)$$

may be referred to as true frequencies. Consequently, the goal of the parameter estimation problem is estimating precisions 130.

In one embodiment, estimating the precision 130 for w includes observing the precision 130 of other entries 124. For example, if other entries 124 with a large number of labels 204 have precision 130 close to 80% then w is also more likely to have precision 130 close to 80%. This dependency may be expressed in the model as described below. The precision 130 of each word is assumed to be chosen randomly and independently from a fixed and unknown distribution $\Pi$ over [0,1]. In a Bayesian analysis, when estimating $p_w$, distribution $\Pi$ represents a prior belief about $p_w$. This allows the use of the given labels 204 for w to perform Bayesian updates so as to obtain the posterior distribution $\Pi_w$. The posterior distribution $\Pi_w$ represents a knowledge of $p_w$ and can be used to derive an estimate of $p_w$. Taking the mean of $\Pi_w$ provides a simple and more optimal way to use $\Pi_w$.

In some embodiments, it is assumed that the prior distribution $\Pi$ is not given to the algorithm 126, and a suitable $\Pi$ may need to be found given the available labels 204. To find the distribution $\Pi$ from which each precision $p_w$ is assumed to be drawn randomly and independently. The distribution $\Pi$ may be modeled using beta distributions. This may be a convenient distribution for Bayesian updates using the labels 204. The beta distribution also allows easy estimation of parameters.

A beta distribution Beta($\alpha,\beta$) has two parameters $\alpha,\beta>0$, and the probability density function (PDF) of the distribution is $c\Theta^{\alpha-1}(1-\Theta)^{\beta-1}$ where c is the normalizing constant. The mean of the distribution is $$\frac{\alpha}{\alpha + \beta}.$$

If a Good (or Bad) label 204 is observed, the posterior $\Pi$ updates to Beta($\alpha+1,\beta$) (or Beta($\alpha,\beta+1$), respectively). More generally, if $g_w=b_w=0$, the posterior $\Pi_w$ is the same as the prior $\Pi$.

Better estimates of the parameters of the prior Beta($\alpha,\beta$) improve the estimate of the obtained precision $p_w$. The system may use a uniform prior case with Beta(1,1) as the prior. The available empirical precisions $$\frac{g_w}{g_w + b_w}$$

may be used to compute the prior using the standard method of moments. Let $$\hat{\mu} = \frac{1}{n} \sum_{w \in A} \frac{g_w}{g_w + b_w}$$

be the sample mean of observed precisions, and $$\hat{\alpha} = \hat{\mu}\left(\frac{\hat{\mu}(1-\hat{\mu})}{\hat{\sigma}^2} - 1\right)$$

and $$\hat{\beta} = (1-\hat{\mu})\left(\frac{\hat{\mu}(1-\hat{\mu})}{\hat{\sigma}^2} - 1\right)$$

which are considered as the parameters.

The mean of the posterior distribution $\Pi_w$, which equals $$\frac{\alpha + g_w}{\alpha + g_w + \beta + b_w},$$

is used to estimate $p_w$. This simplification may not affect the quality of the refinement optimization significantly because the F-score 132 of a dictionary 112 is determined by large sums of precisions 130 multiplied by frequencies. A large sum of precisions 130, each drawn independently from the corresponding distribution $\Pi_w$, is strongly concentrated around the expectation of the sum, which depends only on the mean of each $\Pi_w$.

In one embodiment, the optimization problem may be considered for single dictionary refinement, assuming that the true values of $p_w, f_w$ are given as input for all $w \in A$. The standard notions of precision 130, recall 128 and F-score 132 may be used to measure the quality of the solution for the refinement optimization problem. For a subset of entries S, precision ($P_S$), recall ($R_S$), and F-score ($F_S$) are defined as $$R_S = \frac{\sum_{w \in S} p_w f_w}{\sum_{w \in A} p_w f_w},$$

$$P_S = \frac{\sum_{w \in S} p_w f_w}{\sum_{w \in S} f_w},$$

$$F_S = 2 \frac{\sum_{w \in S} p_w f_w}{\sum_{w \in A} p_w f_w + \sum_{w \in S} f_w}.$$

F-score 132 is the harmonic mean of $P_S$ and $R_S$ and is used to balance the precision 130 with recall 128 of the refined dictionary. When a subset of S is removed from the dictionary A, the residual precision 130, recall 128 and F-score 132 are denoted by $P_{\bar{S}} = P_{A \setminus S}$, $R_{\bar{S}} = R_{A \setminus S}$ and $F_{\bar{S}} = F_{A \setminus S}$. The F-score 132 may be maximized under two constraints:

1. Size constraint: Given an integer $k \leq n$, find a subset S that maximizes $F_{\bar{S}}$, where $|S| \leq k$.
2. Recall constraint: Given a fraction $\rho \leq 1$, find a subset S that maximizes $F_{\bar{S}}$, where the residual recall $R_{\bar{S}} \geq \rho$.

The F-score 132 may alternatively be maximized with no size or recall budget constraints.

$F_{\bar{S}}$ is a non-linear function of the precisions $\hat{p}_w$, $w \in S$, since both the numerator and the denominator are dependent on the set S being removed, thereby making the analysis of the optimization problem non-trivial.

For the size constraint 134, the goal is to maximize $$F_{\bar{S}} = 2 \frac{\sum_{w \in A} p_w f_w}{\sum_{w \in A} p_w f_w + \sum_{w \notin S} f_w},$$

where $|S| \leq k$. Finding out whether there exists a dictionary 112 with F-score 132 of at least $\theta$ may be allow the algorithm 126 to overcome the non-linearity of the objective function. Accordingly, the algorithm 126 guesses a value $\theta$ and then checks if $\theta$ is a feasible F-score 132 for some S. The maximum value of the F-score 132 is then found by doing a binary search.

To check whether $\theta$ is a feasible F-score 132, the system first checks whether there is a set S of entries such that $$F_{\bar{S}} = 2 \frac{\sum_{w \in A} p_w f_w - \sum_{w \in S} p_w f_w}{\sum_{w \in A} p_w f_w + \sum_{w \in A} f_w - \sum_{w \in S} f_w} \geq \theta.$$

Rearranging the terms obtains $$\sum_{w \in S} f_w(\theta - 2p_w) \geq \sum_{w \in A} f_w(\theta - (2-\theta)p_w).$$

The right hand side of the inequality is independent of S, so the system selects the highest (at most) k entries with non-negative value of $f_w(\theta - 2p_w)$ and checks if the sum is at least $$\sum_{w \in A} f_w(\theta - (2-\theta)p_w).$$

A subset S is desired such that $F_{\bar{S}} \geq F_A$. Consequently, the minimum value of the guess is $F_A$ and the maximum value is 1. The algorithm 126 is presented in Algorithm 1, shown below, in terms of parameter $\Delta$ where $\Delta$ is the desired accuracy of the algorithm.

---

Algorithm 1: Algorithm for size constraint (given k and parameter $\Delta$)

1: Let $\theta_{low} = F_A$ and $\theta_{high} = 1$
2: while $\theta_{high} - \theta_{low} > \Delta$ do
3:    Let $\theta = (\theta_{high} + \theta_{low})/2$ be the current guess.
4:    Sort the entries w in descending order of $f_w(\theta - 2p_w)$.
5:    Let S be the top $l \leq k$ entries in the sorted order such that $f_w(\theta - 2p_w) \geq 0$ for all $w \in S$.
6:    if $\sum_{w \in S} f_w(\theta - 2p_w) \geq \sum_{w \in A} f_w(\theta - (2-\theta)p_w)$ then
7:      $\theta$ is feasible, set $\theta_{low} = F_{\bar{S}}$ and continue.
8:    else
9:      $\theta$ is not feasible, set $\theta_{high} = \theta$ and continue.
10:    end if
11: end while
12: Output the set s to define the most recent $\theta_{low}$.

---

A linear time O(n) time algorithm for checking the feasibility includes: (i) use the standard linear time selection algorithm to find the k-th highest entry, for example u, according to $f_w(\theta - 2p_w)$, (ii) do a linear scan to choose the entries w such that $f_w(\theta - 2p_w) > f_u(\theta - 2p_u)$, and then choose entries such that $f_w(\theta - 2p_w) = f_u(\theta - 2p_u)$ to get k entries total, (iii) discard the selected entries with negative values of $f_w(2p_w - \theta)$ and output the remaining $\leq k$ as the set S. However, a simpler implementation of verification uses a mini-heap that gives O(n+k log n) time, whereas a simple sorting gives O(n log n) time.

Since values of the guesses are between 0 and 1 and the algorithm stops when the upper and lower bounds are less than $\Delta$ away, at most $\log(1/\Delta)$ steps will be required. This means that there is an implementation of the algorithm with running time $O(n \log(1/\Delta))$. Setting $\Delta$ to a sufficiently low value may allow the algorithm to find the optimal solution. Specifically, there is an optimal algorithm for maximizing the residual F-score 132 for single dictionary refinement under a size constraint 134. The algorithm runs in time O(n(log n+B)), where B is the number of bits used to represent each of the $p_w$ and $f_w$ values given to the algorithm.

A simple and efficient algorithm that gives a nearly optimal solution when used on a large corpus where frequencies of individual entries 124 are small is described below. The algorithm sorts the entries 124 in increasing order of precisions $p_w$, and selects entries 124 according to this order until the recall budget is exhausted or there is no improvement of F-score 132 by selecting the next entry. The algorithm runs in time O(n log n).

To obtain a lower bound on the F-score 132 of the solution produced by the algorithm, let $w_1, \ldots, w_n$ be the entries 124 sorted by precision 130 and $p_1 \leq \ldots \leq p_n$ be the corresponding precisions 130. Let S* be the set of entries 124 whose removal gives the optimal F-score 132 such that $R_{\bar{S}*} \geq \rho$. Let $$r^* = \sum_{i \in S^*} p_i f_i$$

and let l be the largest index for which $$\sum_{i>l} p_i f_i \geq r^*.$$

Then the set S returned by the algorithm satisfies $$F_{\bar{S}} \geq \frac{2 \sum_{i \in \bar{S}^*} p_i f_i}{\sum_{i \in \bar{S}^*} f_i + \sum_i p_i f_i + f_{max}/p_{\ell+1}}.$$

The lower bound guaranteed by the algorithm differs from the optimal F-score $P_{\bar{S}*}$ only by the addition of the error term $$\frac{f_{max}}{p_{\ell+1}}$$

to the denominator. Individual frequencies are likely to be small when the given corpus and the dictionary 112 are large. At the same time l, and hence $p_{l+1}$ are determined by the recall budget. Therefore, the error term $$\frac{f_{max}}{p_{\ell+1}}$$

is likely to be much smaller than the denominator for a large dictionary 112.

While it is not necessarily optimal in general, without the recall budget (i.e., with p=0) this algorithm finds the solution with the globally optimal F-score 132. The optimal solution can also be found using Algorithm 1 with k=n.

While the algorithms above are described primarily in conjunction with a single dictionary case, the system and method described herein are capable of refining and optimizing an extractor 110 using more than one dictionary 112. For example, in one embodiment there are b dictionaries $A_1, \ldots, A_b$, and there are n entries in total in $$A = A = \bigcup_{l=1}^{b} A_l.$$

Any occurrence τ is produced by matches of one or more dictionary entries 124 combined by the given extraction rule; all such dictionary entries w are said to be in provenance of τ. How the entries 124 produce τ is captured by the provenance expression Prov(τ) of τ; for all such entries w, w∈Prov(τ) is a Boolean expression where the entries 124 in Prov(τ) are treated as variable (every entry in A corresponds to a unique Boolean variable). Given two Boolean expressions $\phi_1$ and $\phi_2$, $\phi_1 = \phi_2$ if the variable sets in $\phi_1$ and $\phi_2$ are the same and the truth tables of $\phi_1$ and $\phi_2$ on these variables are also the same. For the same provenance expression φ, there may be multiple occurrences τ such that Prov(τ)=φ. This is analogous to the single dictionary case, where the trivial provenance expression φ=w for any entry w has one or more occurrences. Note that with extraction rules based on SELECT-PROJECT-JOIN-UNION queries, the provenance expressions are monotone.

The statistical model of a single dictionary 112 is extended to the multiple dictionary case. Every provenance expression φ may be assumed to be a true frequency f(φ)∈[0,1] and a true precision p(φ)∈[0,1]. As before, $$\sum_\phi f(\phi) = 1,$$

where the sum is over all possible Boolean expressions on the set of entries 124, and any occurrence τ has Prov(τ)=φ with probability f(φ). In addition, the label 204 of τ is Good with probability p(φ) and Bad with probability 1−p(φ) randomly and independently of other occurrences, and whether the label 204 of τ is given.

In practice, unlabeled data is sufficiently large, so the frequencies of results are estimated using their empirical frequencies $$\hat{f}(\phi) = \frac{|\tau : Prov(\tau) = \phi|}{\sum_\psi \|\tau : Prov(\tau) = \psi\|},$$

and the hat may be dropped. The precision p(φ) of results φ may be estimated from a limited amount of labeled data. A natural approach to find the precisions 130 of provenance expressions is to estimate them empirically. The problem with this approach is that the possible number of such provenance expression is very large and it is likely that very few (if any) labels 204 would be available for most of the provenance expressions. At the same time, it is quite likely that individual dictionary entries 124 have similar precision 130 across different provenance expressions. This intuition may be represented by strengthening the model described herein in the following way.

It may be assumed that, as in the single dictionary case, every entry w has a fixed (and unknown) precision 130 denoted by $p_w$. For any given occurrence τ such that w∈Prov (τ), the match of w for τ is correct with probability $p_w$ and incorrect with probability $1-p_w$ independent of the other occurrences and other entries 124 in the provenance of τ. Further, it may be assumed that the AQL rule is correct, i.e., the label 204 of τ is Good if and only if its provenance Prov(τ) evaluates to true with the matches of the dictionary entries 124 in Prov(τ) ((Good=true and Bad=false). Computing the probability of any Boolean expression φ given the probabilities of the individual variables is in general #P-hard, and the classes of queries for which the probability of the Boolean provenance can be efficiently computed have been extensively studied in the literature. However, the Boolean provenance expression described herein involves a small number of variables (typically ≤10). Thus, p(φ) may be computed given $p_w$ by an exhaustive enumeration of satisfying assignments of φ and using the assumption of independence of variables.

Here, the goal is to estimate the values of precision $p_w$ given a set of occurrences τ along with their labels 204 and provenance expressions Prov(τ). The Expectation-Maximization (EM) algorithm may be used to solve this problem.

The EM algorithm is a widely-used technique for maximum likelihood estimation of parameters of a probabilistic model under hidden variables. This algorithm estimates the parameters iteratively either for a given number of steps or until some convergence criteria are met.

The following notations present the update rules of the EM algorithm for the problem described herein. The entries 124 are indexed arbitrarily as $w_1, \ldots, w_n$. Each entry $w_i$ has a true precision $p_i=p_{w_i}$. There are N labeled occurrences in $\tau_1, \ldots, \tau_N$. It is assumed that $\tau_1, \ldots, \tau_N$ also denote the labels 204 of the occurrences. So each $\tau_i$ is Boolean, where $\tau_i=1$ (resp. 0) if the label 204 is Good (resp. Bad). If $w_i \in \text{Prov}(\tau_j)$, then $\tau_j \in \text{Succ}(w_i)$.

For simplicity in presentation, it may be assumed that entries 124 from exactly b dictionaries 112 are involved in the provenance expression $\phi_j = \text{Prov}(\tau_j)$ for each occurrence $\tau_j$, although this implementation works for general cases. Hence, each $\phi_j$ takes b inputs $y_{j1}, \ldots, y_{jb}$ and produces $\tau_j$. Each $y_{jl}$ is Boolean, where $y_{jl}=1$ (resp. 0) if the match of the dictionary entry corresponding the $y_{jl}$ is correct (resp. incorrect) while producing the label 204 for $\tau_j$. The entry corresponding the $y_{jl}$ is denoted by $\text{Prov}_{jl} \in \{w_1, \ldots, w_n\}$.

To illustrate the notations, consider the following example extraction rule expressed in the Annotation Query Language (AQL) language:

```
create view FirstLast as
select Merge(F.match, P.match) as match
from FirstName F, LastName L
where FollowsTok(F.match, L.match, 0, 0)
```

The result is a person name if it is a match from first-name (FN) dictionary, followed by a match from last-name (LN) dictionary. This rule is called the FN-LN rule. In this example, b=2 and for every occurrence $\tau_j$, $\tau_j = \phi_j(y_{j1}, y_{j2}) = y_{j1} y_{j2}$. For a Good occurrence "John Smith", $\tau_j=1$, $y_{j1}=1$ (for "John"), and $y_{j2}=1$ (for "Smith"), $\text{Prov}_{j1}=$"John" and $\text{Prov}_{j2}=$"Smith". For a Bad occurrence "Mark Calendar", $\tau_j=0$, $y_{j1}=1$ (for "Mark"), and $y_{j2}=0$ (for "Calendar").

The vector $\vec{x} = \langle \tau_1, \ldots, \tau_N \rangle$ is the observed data, the vector of vectors $\vec{y} = \langle y_{jl} \rangle_{j \in [1,N], b \in [1,t]}$ is the hidden data, and the vector $\vec{\theta} = \{p_1, \ldots, p_n\}$ is the vector of unknown parameters.

The parameter vector at iteration t is denoted to be $\vec{\theta}^t$. Suppose: $c_{w_i, \tau_j, t} = E[y_{jl} | \tau_j, \vec{\theta}^t]$, where $\tau_j \in \text{Succ}(w_i)$ and $\text{Prov}_{jl} = w_i$. It may be shown that the update rules for parameters $p_i$ has a nice closed form:

$$p_i = \frac{C_1}{C_1 + C_2},$$

where $$C_1 = \sum c_{w_i, \tau_j, t}$$

and $$C_2 = \sum (1 - c_{w_i, \tau_j, t}),$$

and the sum is over $1 \leq j \leq N$ such that $\tau_j \in \text{Succ}(w_i)$. These parameter values are considered to be $\theta^{t+1}$, estimation of the parameter in the t+1-th round.

In the single dictionary case, every occurrence $\tau$ of an entry w has $\text{Prov}(\tau)=w$, and when w is deleted only those entries 124 get deleted. However, in the multiple-dictionary case, if an entry w is deleted, multiple provenance expressions $\tau$ such that $w \in \text{Prov}(\tau)$ can disappear from the result set. When a subset of entries $S \subseteq A$ is removed, it may be seen that a provenance expression $\phi$ disappears if and only if, after assigning all variables for entries 124 in S value false and all variables for entries 124 in A\S value true, the Boolean provenance $\phi$ evaluates to false. Denote the set of provenance expressions $\phi$ that survive (do not disappear) after a given set S is deleted by surv(S). For example, if there are three occurrences with provenance expressions uv, u+v, uw+uv, when $S=\{u\}$ is deleted, the set surv(S) will only contain the occurrence with provenance expression u+v. Hence the residual recall ($R_{\bar{S}}$) and the residual precision ($P_{\bar{S}}$) are defined as ($F_{\bar{S}}$ is their harmonic mean):

$$R_{\bar{S}} = \frac{\sum_{\phi \in surv(S)} p(\phi) f(\phi)}{\sum_{\phi} p(\phi) f(\phi)},$$

$$P_{\bar{S}} = \frac{\sum_{\phi \in surv(S)} p(\phi) f(\phi)}{\sum_{\phi \in surv(S)} f(\phi)}$$

The above definitions for multiple dictionary generalize the definitions for single dictionary refinement optimization.

Since the multiple dictionary refinement problem is non-deterministic polynomial-time (NP)-hard under both size and recall constraints 134, 136 several simple and efficient algorithms are proposed and evaluated. These algorithms take the precisions 130 of individual dictionary entries 124 (which may be obtained using the EM algorithm) and a set of occurrences with their provenance expressions as input, and produce a subset of entries 124 across all dictionaries 112 to be removed. The types of algorithms evaluated here are (1) greedy, and, (2) entry-precision-based, or EP-based in short.

To compute the residual F-score 132, both greedy and EP-based algorithms compute the precision 130 of tuples from precision entries 124 under independence assumption. The greedy algorithms select the next entry that gives the maximum improvement in F-score 132. The algorithm stops if no further improvement in F-score 132 is possible by deleting any entry or when the given size or recall budget is exhausted.

On the other hand, the EP-based algorithms exploit the precision 130 of individual dictionary entries 124. The dictionary entries 124 may be treated as if they come from a single dictionary (however, note that the actual provenances were used by the EM algorithm to estimate the precision 130 of entries 124). These algorithms use the selection criteria of incremental algorithms for the single-dictionary case, i.e., maximize $\Delta F$ for size constraint 134 and $\Delta F/\Delta R$ for recall constrain, where $\Delta F$, $\Delta R$ denote the changes in F-score 132 and recall 128 by deleting one additional entry. It may be shown that, in the single-dictionary case, selection according to these criteria can be approximated by selecting entries 124 according to increasing value of $f_w(p_w - F/2)$ for size constraint 134, and $p_w$ for recall constrain, where F is the current value of F-score 132 (the proof appears in the full version). In the multiple-dictionary case, $p_w$ is considered as the given precision 130 of entry w, and $f_w$ as the total frequency of provenance expressions that include w. An entry is selected for removal from the top of such a sorted order if it gives an improvement in F-score 132. The selection continues until the given size or recall budget is exhausted. For optimization under the size constraint 134, the value of F-score 132 is also recomputed after each entry is selected.

Figure 5:
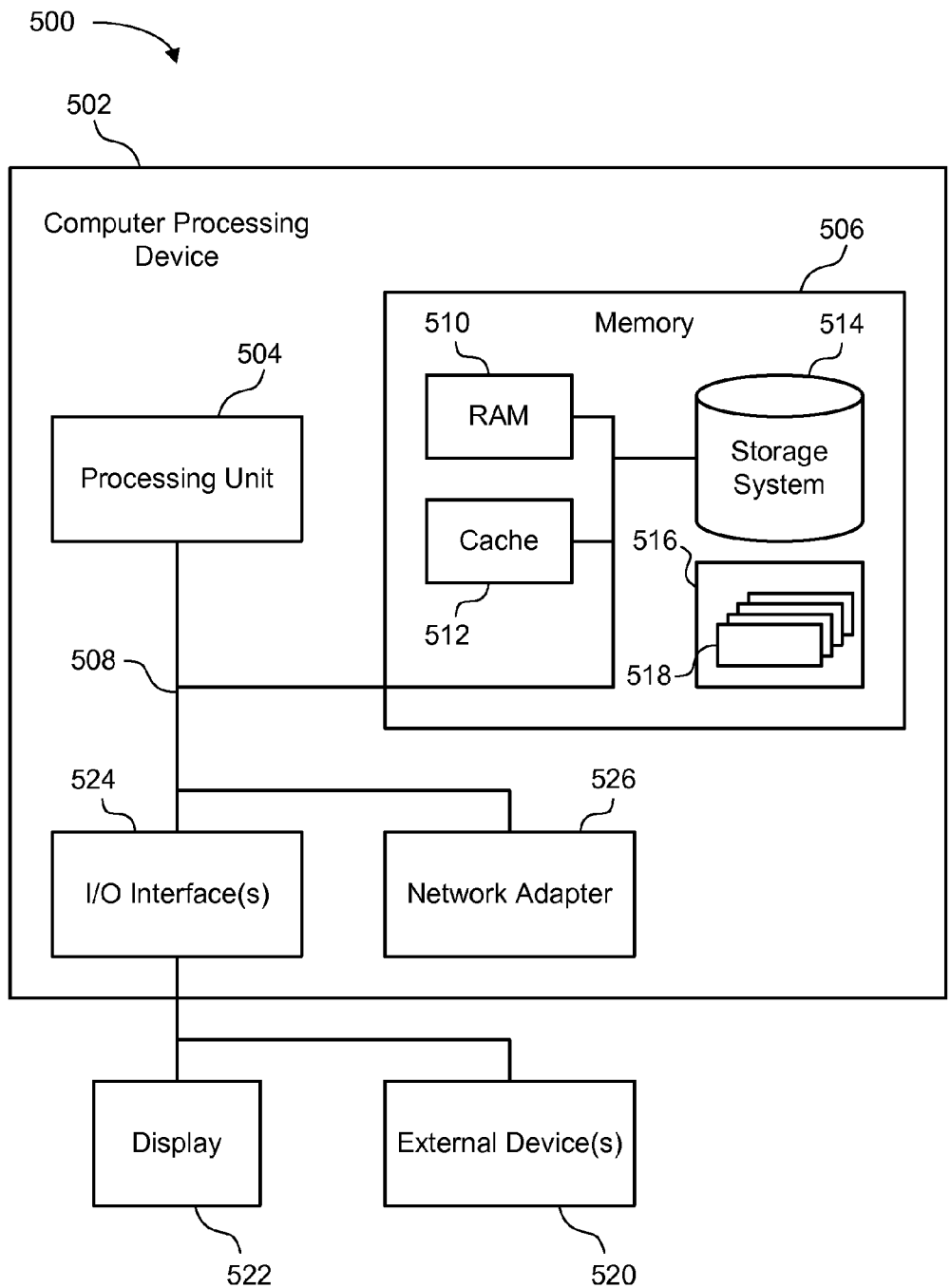
FIG. 5 depicts a schematic diagram of one embodiment of a computer system for implementation of one or more aspects of the functionality described herein.

FIG. 5 depicts a schematic diagram of one embodiment of a computer system 500 for implementation of one or more aspects of the functionality described herein. The illustrated computer system 500 is only one example of a suitable computer architecture and is not intended to suggest any limitation as to the scope of use or functionality of embodiments of the invention described herein. Regardless, the computer system 500 is capable of being implemented to performing any or all of the functionality set forth hereinabove.

The depicted computer system 500 includes a computer processing device 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer processing device 502 may be described in the general context of computer system-executable instructions, such as program modules, being executed by a computer system. Generally, program modules may include routines, programs, objects, components, logic, data structures, and so on that perform particular tasks or implement particular abstract data types. Embodiments of the computer processing device 502 may be practiced locally, remotely, or in distributed cloud computing environments where tasks are performed by remote processing devices that are linked through a communications network. In a distributed cloud computing environment, program modules may be located in both local and remote computer system storage media including memory storage devices.

In one embodiment, the computer processing device 502 includes components and functionality typical of a general-purpose computing device. The components of the computer processing device 502 may include, but are not limited to, one or more processors or processing units 504, a system memory 506, and a bus 508 that couples various system components including the system memory 506 to the processor 504.

The bus 508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer processing device 502 typically includes a variety of computer system readable media (also referred to as computer readable media and/or computer usable media). Such media may be any available media that is accessible by the computer processing device 502. Embodiments of the computer readable media may include one or more of the following types of media: volatile and non-volatile media, removable and non-removable media.

The system memory 506 can include computer system readable media in the form of volatile memory, such as random access memory (RAM) 510 and/or cache memory 512. The computer processing device 502 may further include other removable/non-removable, volatile/non-volatile computer system storage media. By way of example only, a storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 508 by one or more data media interfaces. As will be further depicted and described below, the memory 506 may include at least one program product having a set (e.g., at least one) of program modules that are configured to carry out the functions of embodiments of the invention.

In some embodiments, a program/utility 516, having a set (at least one) of program modules 518, is stored in the memory 506. The program modules 518 generally carry out one or more of the functions and/or methodologies of the embodiments described herein. The memory 506 also may store an operating system, one or more application programs, other program modules, and/or program data. Each of the operating system, one or more application programs, other program modules, and program data or some combination thereof, may include an implementation of a personal computer and/or networking environment.

The computer processing device 502 may also communicate with one or more external devices 520 such as a keyboard, a pointing device, a display 522, etc.; one or more devices that enable a user to interact with the computer processing device 502; and/or any devices (e.g., network card, modem, etc.) that enable the computer processing device 502 to communicate with one or more other computing devices. Such communication can occur via input/output (I/O) interfaces 524. Additionally, the computer processing device 502 can communicate with one or more networks such as a local area network (LAN), a general wide area network (WAN), and/or a public network (e.g., the Internet) via a network adapter 526. As depicted, the network adapter 526 communicates with the other components of the computer processing device 502 via the bus 508. It should be understood that, although not shown, other hardware and/or software components could be used in conjunction with embodiments of the computer processing device 502. Examples, include, but are not limited to: microcode, device drivers, redundant processing units, external disk drive arrays, RAID systems, tape drives, and data archival storage systems, etc.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

An embodiment of a dictionary refinement system 100 includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for refining a dictionary for information extraction, the method comprising:

inputting a set of extracted results from execution of an extractor matching the dictionary to a collection of text, wherein the extracted results are labeled as correct results or incorrect results;

processing the extracted results using an algorithm configured to set a score of the extractor above a score threshold computed as a harmonic mean of a recall of the extractor and a precision of each dictionary entry, wherein the recall comprises a fraction of true positives among a total number of expected occurrences, wherein the precision comprises a probability that an extracted entity is correct; and outputting a set of candidate dictionary entries corresponding to a full set of dictionary entries, wherein the candidate dictionary entries are candidates to be removed from the dictionary based on the extracted results.

2. The method of claim 1, further comprising:

obtaining extracted results from the extractor using a plurality of specialized dictionaries, wherein each dictionary produces extracted results labeled as correct results or incorrect results.

3. The method of claim 1, wherein inputting a set of extracted results further comprises:

using the extractor comprising a set of predetermined rules and matching a plurality of dictionaries to the collection of text to determine the extracted results; and labeling the correct results and the incorrect results based on a user input.

4. The method of claim 1, wherein processing the extracted results further comprises:

computing the set of candidate dictionary entries that set the score above the score threshold, wherein the set of candidate dictionary entries comprises a maximum size constraint.

5. The method of claim 1, wherein processing the extracted results further comprises:

computing the set of candidate dictionary entries that set the score above the score threshold within an allocated recall constraint, wherein the recall constraint determines a minimum coverage of the dictionary.

6. The method of claim 1, wherein processing the extracted results further comprises:

estimating the precision of each dictionary entry in the full set of dictionary entries using the extracted results, wherein the algorithm is a statistical estimation algorithm.

7. The method of claim 6, wherein the algorithm is an expectation-maximization (EM) algorithm.

* * * * *